United States Patent

[11] 3,588,514

[72] Inventor Frederick W. Simpkins
 Hanover, Mass.
[21] Appl. No. 857,149
[22] Filed Sept. 11, 1969
[45] Patented June 28, 1971
[73] Assignee Alden Research Foundation
 Westboro, Mass.

[54] GRAPHIC SCANNING APPARATUS WITH FLEXIBLE OPTICAL FIBERS
 23 Claims, 12 Drawing Figs.

[52] U.S. Cl. .................................................. 250/227,
 250/219, 178/7.6, 350/96
[51] Int. Cl. .................................................. G02b 5/16,
 H04h 3/06
[50] Field of Search.......................................... 250/227,
 219 (I), (DT), 234, 226; 350/96 (B); 178/7.6, 5.2,
 6 (LCR), 7.1 (E)

[56] References Cited
UNITED STATES PATENTS

| | | | |
|---|---|---|---|
| 2,939,362 | 6/1960 | Cole | 178/7.6X |
| 2,982,175 | 5/1961 | Eisler | 250/227X |
| 3,043,179 | 7/1962 | Dunn | 250/227X |
| 3,408,497 | 10/1968 | Lowe | 350/96X |
| 3,436,757 | 4/1969 | Schwab | 250/227X |

Primary Examiner—Walter Stolwein
Attorney—Roberts, Cushman & Grover

ABSTRACT: In a facsimile scanner an endless belt is driven by wheels on two straight paths one of which passes parallel to an original document, or an image thereof, fed at right angles to the path of the belt. A hollow shaft is coupled to the belt to rotate at the same r.p.m. One end of a flexible optical pickup fiber is held on the belt viewing the document. The other fiber end is carried axially in the hollow shaft and directed at a phototube. As movement of the belt causes the first fiber end to scan the document along one straight line path, the fiber intermediate its ends flexes as the distance between the two ends of the fiber varies. Additional fibers adjacent the pickup fiber conduct light to the document from a lamp rotating with the hollow shaft, illuminating the area of the document to be scanned by the pickup fiber. By color filtering two or more adjacent pickup fibers a color document is scanned and electrical color signals generated sequentially by one phototube or simultaneously by several phototubes. Alternatively several fibers scan a transverse zone of the document simultaneously intersecting characters thereon and energizing a plurality of photocells for electrical recognition of successive characters. Light from a lamp modulated by a facsimile signal source may be carried by fibers into photosensitive paper scanned by the moving ends of the fibers to record the facsimile signals on the paper.

Inventor
Frederick W. Simpkins
by Roberts, Cushman & Grover
Attys

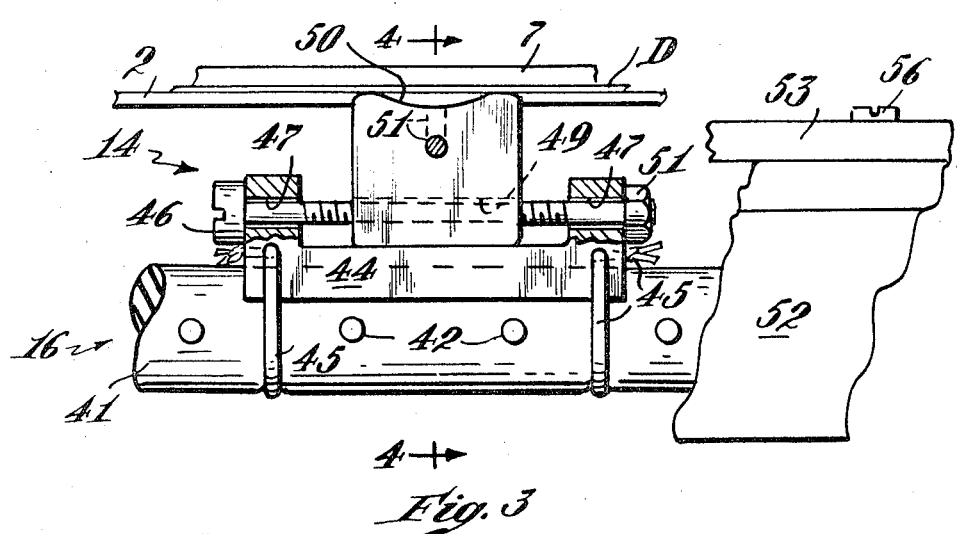
Fig. 3
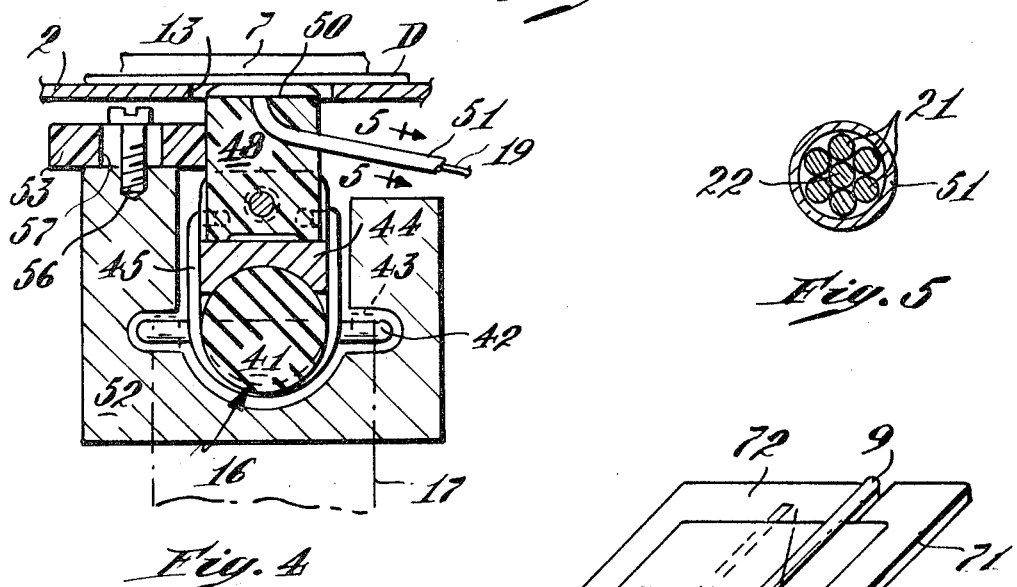
Fig. 4
Fig. 5
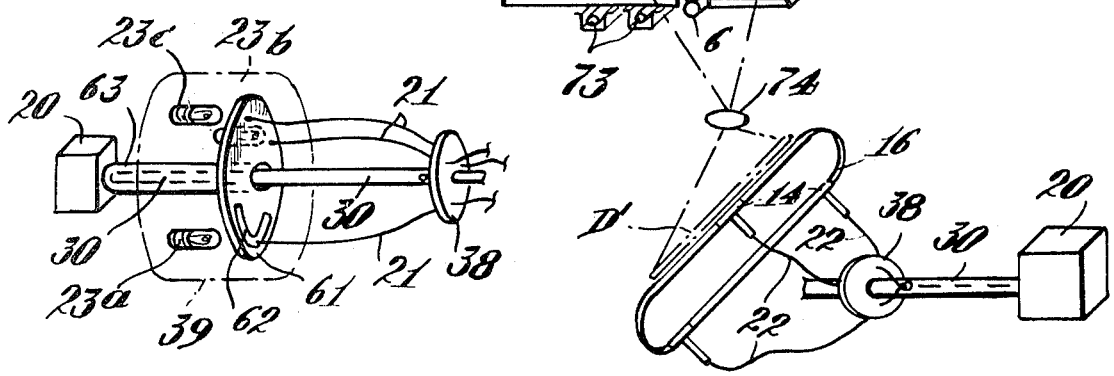
Fig. 6
Fig. 7

GRAPHIC SCANNING APPARATUS WITH FLEXIBLE OPTICAL FIBERS

This invention relates to graphic scanners, both those which scan a document or image thereof line by line and generate electrical signals therefrom, and those which receive facsimile signals and record them line by line by scanning sensitive paper and marking the facsimile signals thereon. In each case an image plane is traversed effectively by one or more flying spots which either apply modulated light to or pick up modulated light from the image plane. It has been found that light-conducting rods are useful for transmitting the modulated light to or from the image plane, but hitherto the end of such a rod constituting the flying spot has been moved on a circular path relative to the image plane. Consequently the facsimile signals represent an arcuate line of the original document which is incompatible with the almost universally accepted straight line scanning equipment, as in U.S. Pat. No. 3,192,391. Or some additional circle-to-line converter must be inserted between the light-conducting rod, as in U.S. Pat. No. 3,365,580, adding to the expense and complexity of the scanner without any improvement in its operation.

The object of the present invention is to provide a graphic scanner which employs optical light conductors, and which permits a straight line scan.

According to the invention a graphic scanner comprises a flexible orbiting carrier, means to drive the carrier on an elongate closed path parallel to an image plane, a rotating member coupled to said carrier to rotate in synchronism therewith, a stationary light transducer, and a flexible light transmission fiber having one end connected to said carrier and movable therewith to scan said image plane on said elongate path, the other end of said fiber being held substantially axially on said rotating member, and an intermediate length of said fiber being free to flex as the distance between the two ends of the fiber varies.

For the purpose of illustration typical embodiments of the invention are shown in the accompanying drawings in which:

FIG. 3 is an enlarged elevation of a scanning belt in the scanner of FIGS. 1 and 2;

FIG. 4 is a section on line 4–4 of FIG. 3;

FIG. 5 is an enlarged section on line 5–5 of FIG. 4;

FIG. 6 is an enlarged detail of a modification of the scanner of FIGS. 1 and 2;

FIG. 7 is an isometric view of a further modification of the scanner;

Figure 1:
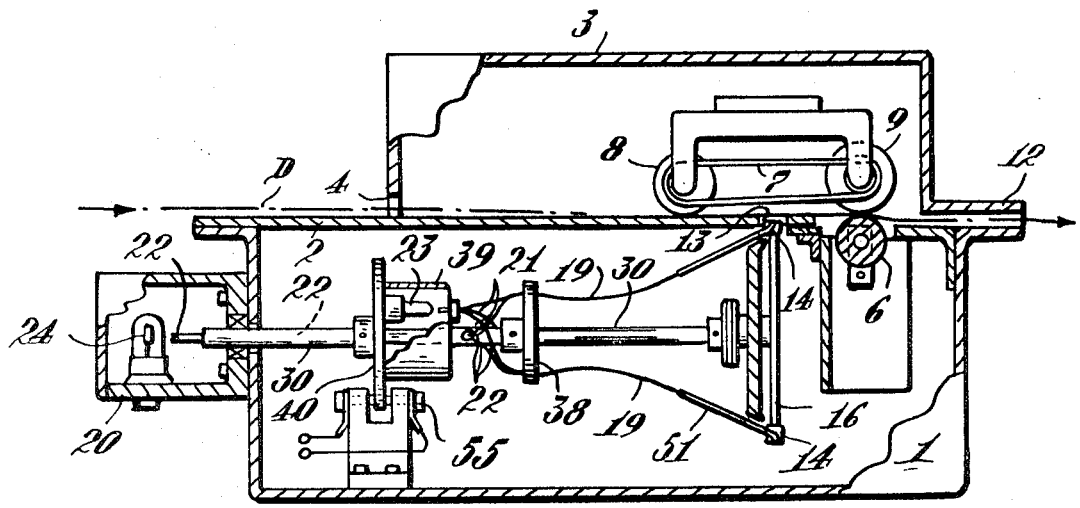
FIG. 1 is a slide elevation of a facsimile scanner according to the invention, parts being broken away.

Shown in FIGS. 1 to 5 is a facsimile scanner for a document D, or other graphic matter, comprising a housing formed by a base 1, a cover plate 2 and a cover 3. The base 1 and cover 3 form an entrance 4 admitting the document into the housing onto the cover plate. On insertion through the entrance 4 the document is gripped between a driven roll 6 and an idler roll 9, and fed in the direction of the arrow along the cover plate 2, and thence through an exit 12 from the housing. A second idler roll 8 is slightly smaller in diameter than roll 9 and is rotated by a belt 7 at a slightly slower peripheral speed so as to drag on the paper and hold the document tight between rolls 8 and 9. During feed along the cover plate 2 the document passes over a narrow aperture 13 in the plate 2, which aperture extends transversely of the document feed and is longer than the document is wide. Projecting through the aperture 13 from below the cover plate 2 is one of three riders 14 carried on an endless, toothed scanning belt 16. The belt is orbited on a sprocket wheel 17 driven by a motor M and an idler wheel 18 so that the riders 14 successively traverse the aperture 13 parallel to the image plane of the document. On each rider are mounted the ends of a cable 19 of optical, light-transmitting fibers 21 and 22. In each cable a group of fibers 21 transmit light from a lamp 23 to the rider 14 and onto a spot on the document D. At least one fiber 22 in each cable picks up the illuminated spot on the document as modulated by the dark and light graphic material on the document and transmits the modulated light to the other end of the fiber which is directed at a phototube 24 in a light-tight housing 20. As the riders scan successive transverse lines of the moving document, corresponding series of light modulations are converted into electrical facsimile signals by the phototube, which here acts as a light-to-electrical signal transducer.

Figure 2:
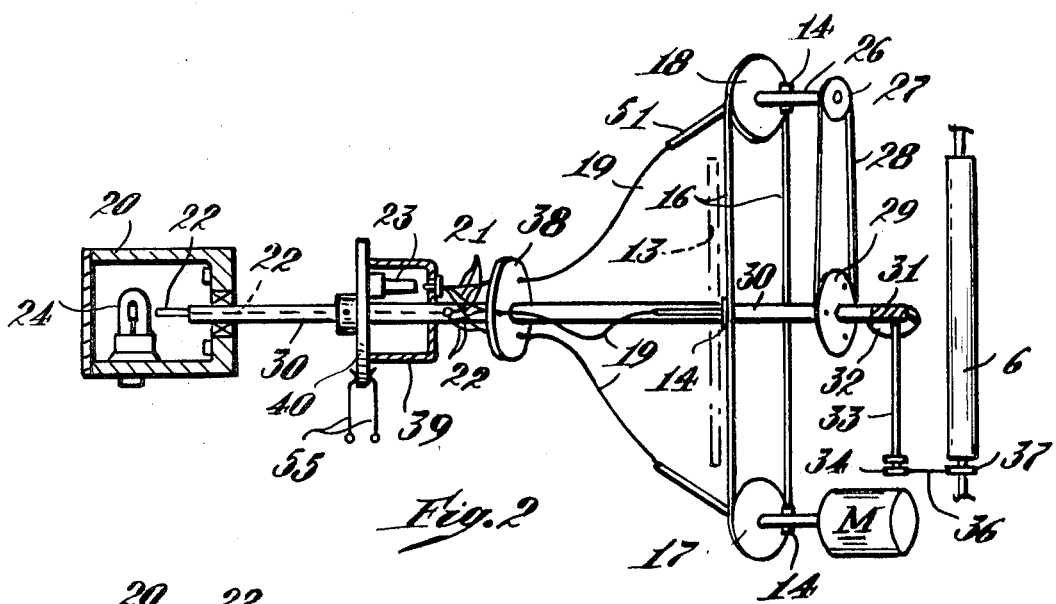
FIG. 2 is an isometric, schematic plan view of the scanner, parts being omitted.

As shown particularly in FIG. 2 the motor M driving the belt sprocket wheels 17 and 18 is linked by a shaft 26, pulley 27, belt 28 and pulley 29 to a hollow shaft 30 which is journaled at its other end in the housing 20 into which it projects toward the phototube. The ratio of pulleys 27 and 29 is selected so that the shaft 30 rotates synchronously, that is, at the same r.p.m., as the belt 16. One end of the shaft 30 carries a worm 31 meshing with a gear 32 on shaft 33. The shaft 33 is linked to the document drive roll 6 by a belt 36 and pulleys 34 and 37 selected in a ratio to drive the document at a linear speed correlated with the frequency with which the riders 14 on the scanning belt 16 traverse the scanning aperture 13, the correlation causing lengthwise feed of the document at the line by line scan rate of the riders.

In FIGS. 3 to 5 are shown enlarged details of the fiber cable 19 and its termination at the riders 14 on the scanning belt 16. The scanning belt 16 has an elastomeric cylindrical body 41 with metal pins 42 projecting on each side where they are engaged by the teeth 43 of the sprocket wheels 17 and 18 (FIG. 4). Each rider 14 comprises a small U-shaped metal frame 44 whose underside is curved to conform to the cylindrical belt body 41. The block is simply and securely tied to the belt by a strand 45 of nylon monofilament passed through bores in the frame and knotted at each end of the frame. A bolt 46 fits loosely in bores 47 through each upstanding arm of the U-shaped frame and extends through the threaded bore 49 of a Teflon plastic block 48 so that turning the bolt adjusts the block lengthwise of the frame 44 and belt 16. The bolt is locked by a nut 51. Each rider is initially spaced approximately one-third of the belt length from the other riders, that is, equivalent to 120° spacing on a circle. Fine adjustment to precise 120° spacing is accomplished by the bolt 46. Underneath the scanning aperture 13 is a guide rail 52 which loosely conforms to the lower cross section of the belt body 41 and teeth 42. A track 53 of Teflon plastic extending parallel to the scanning aperture 13 bears against the rider block 48 guiding the block on a precise straight line along the aperture. Screws 56 through an elongate slot in the track 53 adjustably secure the track to the guide rail 52.

Anchored in each rider block 48 is a fine, hollow metal tube 51 enclosing the fibers 21 and 22 of each cable and protecting them against excess flexing and wear adjacent the belt 16. The end of the tube curves outwardly of the block 48, terminating flush with a curved recess 50 in the end of the block bearing against the document D. The depth of the recess, about 0.0005 to 0.001 inch spaces the tube end slightly from the document to reduce wear and accumulation of matter on the tube end and to permit the light supplying fibers 21 to illuminate an area of the document viewed by the light pickup fiber 22. As shown in FIG. 5 the tube holds a group of six light-supplying fibers 21 around a central light pickup fiber 22. Any desired number of supply and pickup fibers may be used.

From the tubes 51 each group of fibers 19 extends to a support disc 38 carried on the hollow shaft 30. There each of the three light pickup fibers 22 separates from the light supply fibers and enters the hollow shaft wherein they extend to the end of the shaft substantially axially thereof and substantially anchored with respect to the phototube 24 at which they are directed, although rotating on the shaft axis. From the support disc 38 the light supply fibers 21 run together into a housing 39 for the lamp 23. The housing 39 is fixed on and rotates with the shaft 30 as does a slipring 40 which supplies current to the lamp from brushes 55. Between the support disc 38 and the riders 14 the fibers are slack and free to flex as the distance between the riders and disc varies during rotation of the disc and orbiting of the carrier. The diameter of the disc 38 and radial spacing of the fibers should be as great as space allows to minimize flexing of the fibers.

Light from the lamp 23 is transmitted by the supply fibers 21 from the lamp 23 to their other ends on the belt 16 and thence onto successive small areas of the document D. As each small area is illuminated the central fibre 22 of each group picks up light from an elemental area of the document modulated according to the light or dark graphic matter in the elemental area, and at its other end actuates the phototube causing it to produce electrical signals corresponding to light modulations. Because the belt carries each rider 14 on a straight line the successive elemental areas are scanned on a straight line and the modulated electrical signals produced can be used in any straight line recorder.

When each rider completes its line scan it is followed after a very brief interval by another rider. As shown in FIGS. 1 and 2, each rider carries supply fibers 21 continuously illuminated by the lamp 23. However, under most circumstances only one pickup fiber 22 will receive light reflected from the document D, and only one pickup fiber at a time actuates the phototube, the system thus providing commutation of the three pickup fibers.

To eliminate the possibility that more than one pickup fiber can actuate the phototube during one scan, the lamp assembly can be modified as shown in FIG. 6. Within the lamp housing 39 are mounted three lamps 23a, 23b and 23c disposed 120° apart on a circle and rotating within the housing on the shaft 30. Between the anchored ends of the light supply fibers 21 and the lamps is a light baffle 61 with an arcuate window 62 extending 120° on the circle of the lamps. The baffle 61 is held stationary on a collar 63 around the shaft 30, the collar being anchored to the phototube housing 20. The window is disposed such that light from one of the lamps 23a to 23c is transmitted to only one supply fiber 21 at a time, namely that fiber whose other end is scanning the document. The other supply fibers are not illuminated and thus their associated pickup fibers cannot actuate the phototube.

FIG. 7 illustrates a scanner in which a projected image rather than a physical document is scanned. The document D is fed by rolls 6 and 9 across a table 71 having a slot 72 through which a narrow line of the document is illuminated by lamps 73. An image D' of the illuminated line is projected by a lens 74 to a plane adjacent the scanning belt 16. The riders 14 on the belt carry only pickup fibers 22 which lead through the shaft 30 to the phototube housing 20. The pickup fibers function as in the scanners of FIGS. 1 to 6. The function of light supply fibers is replaced by the lamps 73 and lens 74.

Figure 12:
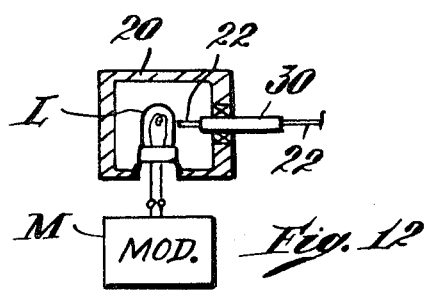
FIG. 12 illustrates a detail of the scanner of FIG. 1 modified for recording.

The scanning system of FIGS. 1 and 2 may also be used for recording on photosensitive paper. As shown in FIG. 12, a lamp L is substituted for the phototube within the light-tight housing 20. The lamp is then excited by electrical facsimile signals from a modulator M. As photosensitive paper is fed past the scanning aperture 13 (FIGS. 1 and 2), a record is exposed on the paper by modulated light supplied by the lamp to the fibers 22 during each line scan of the riders 14. In this instance the lamp acts as an electrical signal-to-light transducer.

The scanners have been described for black and white, or monochrome, scanning, but may be used for three-color facsimile signal generation. In this case each of the three riders 14 carries a pickup fiber 21 which is stained or otherwise filtered with one of three elemental colors. For example, the three pickup fibers are stained respectively red, blue and green, and thus act as filters each transmitting from a colored document only information representing one color. The rate of feed of the document D is slowed to one-third the speed relative to the speed of the scanning belt 16, or the scanning belt is accelerated to three times black and white speed, so that all three riders make a scan of each elemental line of the document. In line sequence, then, the phototube will be actuated by three different color modulated signals and will produce three distinct series of electrical signals in sequence for each complete revolution of the belt 16.

Figure 10:
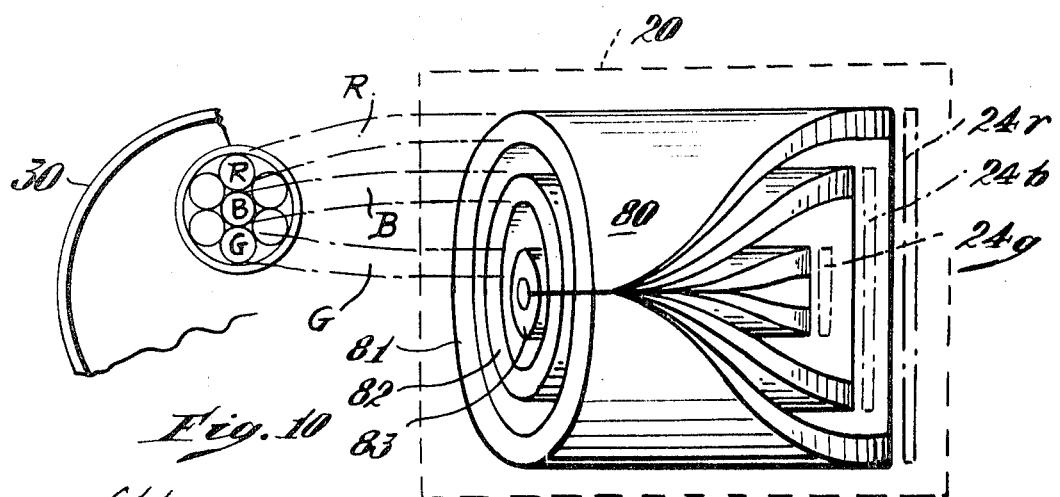
FIG. 10 is an optical diagram of a still further modification of the scanner of FIGS. 1 and 2 for simultaneous color scanning.

Instead of the above described sequential color scanning, the three color signals may be generated simultaneously by providing each rider 14 with three pickup fibers R, B, G, respectively stained red, blue and green at their scanning ends so that each rider scans all three color aspects of the document during one scan. Each of the three colored fibers transmits light of only one color aspect of the document. At the other ends of the fibers in the photocell housing 20 as shown in FIG. 10, the fibers R, B and G are held in a bundle off the axis of the hollow tube 30 so that their ends move in circles concentric with a circle-to-line converter 80. The converter 80 comprises at one end three concentric light-conducting tubes 81, 82 and 83 respectively opposite the circular paths of the R, B, and G fibers. The opposite ends of the tubes are fanned out into straight line edges directed at three photocells 24r, 24b and 24g respectively. Regardless of the angular position of each fibre end on its circular path the converter conducts light from the fibers to their respective photocells, simultaneously producing three electric color signals. These signals may be used for simultaneous recording in color by facsimile apparatus such as is shown in U.S. Pat. No. 2,758,906.

Figure 8:
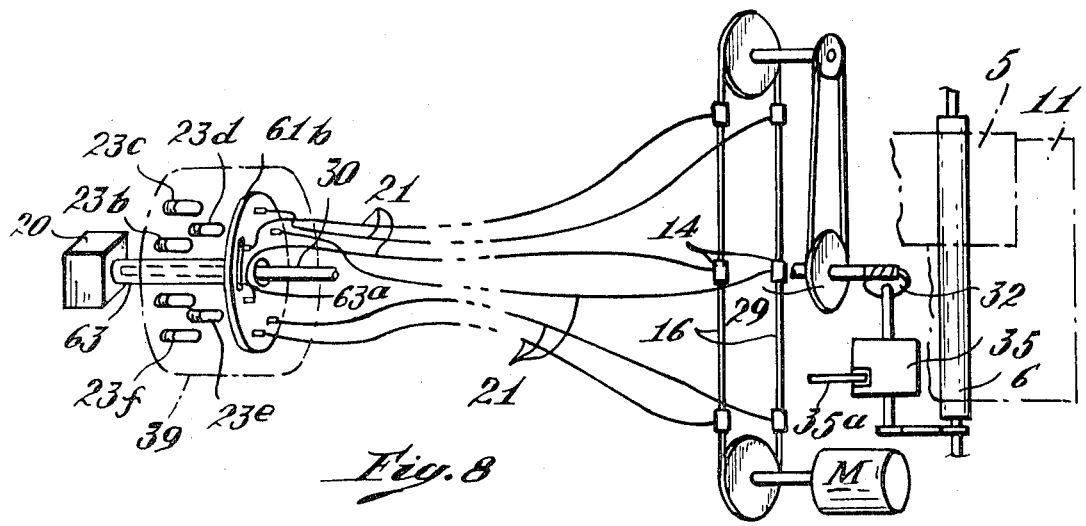
FIG. 8 is an isometric, schematic view of a two-speed scanner of different widths of documents.
Figures 9, 11:
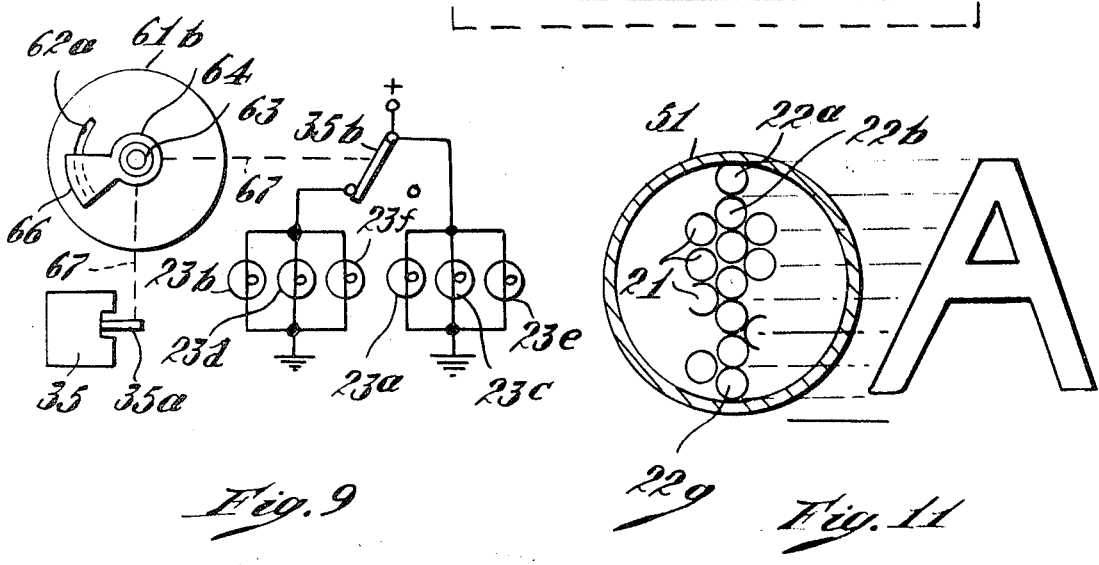
FIG. 9 is an electromechanical schematic diagram of a speed change detail of the scanner of FIG. 8.
FIG. 11 is a section like FIG. 5 of a modification of the scanner for character recognition.

Shown in FIGS. 8 and 9 is a modification of the scanner of FIGS. 1 and 2 adapted for the scanning at either of two speeds of documents of different widths. Shown as examples are documents 5 and 11 respectively of 5 and 11 inches in width. In order that the two different widths be scanned at the same line frequency, the riders 14 on the scanning belt 16 must traverse the 5-inch document about twice as frequently as the 11-inch. Therefore the 5-inch document must be fed lengthwise by the feed roll 6 at twice the speed of the 11-inch document. The document feed rate is doubled by throwing the lever 35a of a gear change box 35 between the belt drive and the feed roll 6. Scan frequency is doubled by doubling the number of riders 14 on the scanning belt 16. Thus there are six riders 14 in the scanner of FIG. 8, each rider carrying at least one light pickup fiber 21. The pickup fibers are anchored at their opposite ends in the rotating lamp housing 39 at 69° intervals. The anchored ends of the fibers are opposite six similarly positioned lamps 23a to 23f. In the housing 39 is a baffle 61b with an arcuate window 62a extending on the circle of the fibre ends and lamps, the baffle being held stationary by a collar 63 anchored to the photocell housing 20. As shown in FIG. 9 the arcuate window 62a is adjustable from 60° of arc, as shown, to 120° by a vane 66 carried on a sleeve 64 around the collar 63. The sleeve 64 has a mechanical link 67 to the gear-box lever 35a and a switch 35b controlling supply of power to lamps 23b, 23d and 23f.

With the lever 35a, vane 66 and switch 35b in the position shown in FIGS. 8 and 9 all lamps are illuminated, the window 62a is open 60° and the feed roll 6 is turning at the faster speed for the 5-inch document 5. The fiber ends for each rider 14 will be illuminated only for the period corresponding to 60° of arc during which the rider is traversing the width of document 5, this traverse being slightly less than the spacing between successive riders 14 on the left 16. The pickup fibers (not shown) will thus transmit the document-modulated light to the photocell in housing 20 only during this shorter and more frequent scan than the 11-inch scan now to be described.

When the lever 35a, vane 66 and switch 35b are transferred from the positions shown, the roll 6 feeds an 11-inch document 11 at about half the 5-inch speed, the vane 66 opens the window 62a to 120° of arc, and alternate lamps 23b, 23d and 23f are extinguished. Consequently the fiber ends on alternate riders only are illuminated during the longer interval of a full scan corresponding to 120° of arc. The linear fiber optic-scanning belt may thus be used without physical alteration both for the faster scan of the smaller, 5-inch document, and the normal scanning speed of the larger, 11-inch document.

The fiber optic-scanning belt used for single line-by-line scanning in facsimile as heretofore described is also useful for simultaneous multiple line scanning as, for example, in character recognition. For this purpose, and as shown in FIG. 11, a plurality of pickup fibers 22a to 22g in the rider tube 51 of FIGS. 3 to 5 are disposed in a linear series at right angles to the direction of scan as indicated by the arrow in FIG. 11. The series of fiber ends extends to at least the height of the characters, e.g. "A," on a document to be scanned. The opposite ends of the fibers are optically coupled to a set of separate photocells similar as shown and described with reference to FIG. 10. Other fibers 21 supply light to the document as the series of fibers 22a to 22g simultaneously scan a character. As the respective portions of the character they view modulate the light picked up, the respective photocells will generate corresponding signals. The pattern of simultaneous signals of all the photocells may be compared with a computer-stored pattern for identity and recognition of the scanned character. Or the several signals may be transmitted to a multistylus recorder, such as shown in U.S. Pat. No. 2,785,942, for simultaneous recording.

It should be understood that the present disclosure is for the purpose of illustration only and that this invention includes all modifications and equivalents which fall within the scope of the appended claims.

I claim:

1. A graphic scanner comprising a flexible orbiting carrier, means to drive the carrier on an elongate closed path parallel to an image plane, a rotating member coupled to said carrier to rotate in synchronism therewith, a stationary light transducer, and a flexible light transmission fiber having one end connected to said carrier and movable therewith to scan said image plane on said elongate path, the other end of said fiber being held substantially axially on said rotating member in light exchanging relationship with said transducer, and an intermediate length of said fiber being free to flex as the distance between the two ends of the fiber varies.

2. Apparatus according to claim 1 wherein said other fiber end is held by said rotating member on the axis thereof.

3. A scanner according to claim 1 characterized by a light source rotating on said member and an additional fiber connected between said carrier and light source for illuminating an elemental area of said image plane viewed by the first said fibre.

4. Apparatus according to claim 1 wherein said rotating member comprises a housing and a light source mounted therein, and characterized by a second flexible light transmission fiber having one end connected to said carrier adjacent the first said fiber and having its other end anchored on said housing with respect to said light source, an intermediate length of said second fiber being free to flex as the distance between the two ends of the fiber varies.

5. Apparatus according to claim 1 wherein said rotating member comprises a hollow shaft enclosing said fiber adjacent said light transducer.

6. Apparatus according to claim 5 wherein said transducer is mounted in a light-tight housing supporting one end of said hollow shaft adjacent the transducer.

7. Apparatus according to claim 1 wherein said orbiting carrier comprises an endless belt.

8. Apparatus according to claim 1 wherein said transducer comprises a photoelectric device converting light to electrical signals.

9. Apparatus according to claim 1 wherein said transducer comprises a light source for converting electric signal modulations to light modulations.

10. A scanner according to claim 1 characterized by means to project an image of graphic matter on said plane.

11. A scanner according to claim 1 characterized by a plurality of light sources carried on and rotating with said member, a plurality of fibers connected at spaced locations on said carrier and extending to said light sources respectively, and a mask interposed between said fibers and light sources, said mask being stationary relative to said lamps and having an aperture allowing successive exposure of the fibers to the respective sources.

12. Apparatus according to claim 11 wherein said aperture comprises an arcuate slot coaxial with the locations of said fiber and light sources.

13. Apparatus according to claim 1 characterized by a plurality of fibers connected between spaced locations on said carrier and said transducers.

14. Apparatus according to claim 1 characterized by a plurality of transducers and a plurality of fibers optically connected between spaced locations on said carrier and respective transducers.

15. Apparatus according to claim 14 wherein said fibers comprise color-filtering means for transmitting selected color aspects of said image plane.

16. Apparatus according to claim 15 wherein a single-color filtering means is associated with each said spaced location.

17. Apparatus according to claim 15 wherein a plurality of different-color filtering means are associated with each said spaced location.

18. Apparatus according to claim 1 characterized by a plurality of fibers connected at a location on said carrier and disposed to scan different parallel portions of said image plane simultaneously.

19. Apparatus according to claim 18 characterized by a plurality of photoelectric devices, said plurality of fibers being optically connected respectively between said location and said transducers.

20. Apparatus according to claim 1 characterized by means to feed documents through said image plane and means to change the speed of said feed.

21. Apparatus according to claim 20 characterized by a plurality of fibers carried at one end at spaced locations of said fibers, means for illuminating the other ends of said fibers, and control means cooperative with said speed change means for changing the number of fibers lighted by said illuminating means.

22. Apparatus according to claim 1 characterized by rider carried on said carrier and a metal tube anchored on the rider with its open end at said image plane, said fiber being held in said tube to prevent flexing of the fiber adjacent the carrier.

23. Apparatus according to claim 22 wherein said tube is curved away from said image plane toward said rotating member.